United States Patent
Marupaduga

(10) Patent No.: US 11,758,600 B1
(45) Date of Patent: Sep. 12, 2023

(54) CONTROLLING DUAL CONNECTIVITY BASED ON INTER-ACCESS-NODE FLOW OF USER-PLANE COMMUNICATION OF DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 83 days.

(21) Appl. No.: 17/247,563

(22) Filed: Dec. 16, 2020

(51) Int. Cl.
*H04W 76/15* (2018.01)
*H04W 28/02* (2009.01)

(52) U.S. Cl.
CPC ....... *H04W 76/15* (2018.02); *H04W 28/0289* (2013.01)

(58) Field of Classification Search
CPC .......................... H04W 76/15; H04W 28/0289
See application file for complete search history.

(56) References Cited

U.S. PATENT DOCUMENTS

| | | | | |
|---|---|---|---|---|
| 10,834,637 | B1* | 11/2020 | Pawar | H04W 36/0069 |
| 11,026,282 | B1* | 6/2021 | Marupaduga | H04W 36/0069 |
| 11,051,186 | B1* | 6/2021 | Pawar | H04W 24/08 |
| 11,071,159 | B1* | 7/2021 | Marupaduga | H04W 28/085 |
| 11,240,715 | B1* | 2/2022 | Marupaduga | H04W 36/08 |
| 11,252,637 | B1* | 2/2022 | Marupaduga | H04W 48/02 |
| 11,265,751 | B1* | 3/2022 | Marupaduga | H04W 28/0205 |
| 11,265,945 | B1* | 3/2022 | Marupaduga | H04W 24/08 |
| 11,284,467 | B1* | 3/2022 | Marupaduga | H04W 76/16 |
| 2015/0092707 | A1* | 4/2015 | Kwon | H04W 76/15 370/329 |
| 2016/0157155 | A1* | 6/2016 | Chiba | H04W 76/22 455/436 |
| 2016/0381627 | A1* | 12/2016 | Kozat | H04W 36/36 455/436 |
| 2019/0028959 | A1* | 1/2019 | Svedevall | H04W 76/10 |
| 2019/0159097 | A1* | 5/2019 | Tang | H04W 36/08 |
| 2019/0268811 | A1* | 8/2019 | Makinen | H04W 88/14 |
| 2020/0045583 | A1* | 2/2020 | Kim | H04W 28/08 |
| 2020/0120535 | A1* | 4/2020 | Dai | H04W 76/00 |
| 2020/0205062 | A1* | 6/2020 | Azizi | H04W 24/08 |
| 2021/0022073 | A1* | 1/2021 | Kwok | H04W 72/085 |

(Continued)

FOREIGN PATENT DOCUMENTS

WO    WO-2021247753 A2 * 12/2021

*Primary Examiner* — Parth Patel

(74) *Attorney, Agent, or Firm* — McDonnell Boehnen Hulbert & Berghoff LLP

(57) ABSTRACT

In a wireless communication system including a first access node and a second access node, where the first and second access nodes cooperatively support providing user equipment devices (UEs) with dual-connectivity service, where data flows between the first and second access nodes, and where a proper subset of the data flowing between the first and second access nodes is user-plane data of the dual-connectivity service, a method includes (i) detecting that a total volume of the user-plane data that flows between the first and second access nodes is at least as high as a predefined threshold, and (ii) based on at least the detecting, blocking new establishment of the dual-connectivity service.

20 Claims, 4 Drawing Sheets

(56) References Cited

U.S. PATENT DOCUMENTS

| | | | | |
|---|---|---|---|---|
| 2021/0136656 A1* | 5/2021 | Koutsaftis | ............. | H04L 1/1896 |
| 2021/0266999 A1* | 8/2021 | Laselva | ................. | H04W 76/15 |
| 2021/0385894 A1* | 12/2021 | Amend | ................... | H04W 4/80 |
| 2021/0385897 A1* | 12/2021 | Purkayastha | ....... | H04W 36/305 |
| 2022/0049985 A1* | 2/2022 | Nilsson | ................. | G01F 23/284 |
| 2022/0070771 A1* | 3/2022 | Tang | ..................... | H04L 1/0002 |
| 2022/0150769 A1* | 5/2022 | Vivanco | ............ | H04W 36/0022 |
| 2022/0287135 A1* | 9/2022 | Wu | ........................ | H04W 76/30 |
| 2022/0345883 A1* | 10/2022 | Wu | ................... | H04W 36/0038 |

\* cited by examiner

CONTROLLING DUAL CONNECTIVITY BASED ON INTER-ACCESS-NODE FLOW OF USER-PLANE COMMUNICATION OF DUAL-CONNECTIVITY SERVICE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random-access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, with the access node to establish an RRC connection or the like through which the access node will then serve the UE on the carrier.

Further, if the UE is not already registered for service with the core network, the UE could transmit to the access node an attach request, which the access node could forward to a core- network controller for processing. And the core-network controller and access node could then coordinate setup for the UE of a bearer extending between the UE and a core-network gateway that provides transport-network connectivity, with the bearer including a data radio bearer portion extending between the UE and the access node an access-bearer portion extending between the access node and the gateway.

Once the UE is so connected and registered, the access node could then serve the UE in a connected mode on the carrier, managing downlink air-interface communication of packet data to the UE and uplink air-interface communication of packet data from the UE.

With the example air interface described above, for instance, when packet data for the UE arrives at the core network from a transport network, the data could flow over the UE's access bearer to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding over the UE's access bearer and through the core network to the transport network.

When the industry advances from one generation of wireless technology to the next, or in other scenarios, networks and UEs may also support dual-connectivity service, where a UE is served on multiple co-existing connections, perhaps according to different respective RATs.

For instance, a network could include a first access node configured to provide coverage and service according to a first RAT and a second access node configured to provide overlapping coverage and service according to a second RAT, and a UE positioned concurrently within coverage of both the first and second access nodes could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual connectivity (or "non-standalone" (NSA) connectivity) could help facilitate increased peak data-rate of communications, by multiplexing the UE's communications across the multiple air-interface connections. Further or alternatively, dual connectivity may provide other benefits compared with serving a UE on a single connection (as "standalone" (SA) connectivity).

In a representative dual connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When a UE that supports dual-connectivity service enters into coverage of such a system, the UE could initially scan for and detect coverage of a first-RAT access node on a first-RAT carrier and could engage in signaling to establish a first-RAT connection between the UE and that access node on that carrier as discussed above. Further, perhaps having determined from profile data that the UE is dual connectivity-capable, the UE's serving access node, acting as an MN, could then engage in a process to set up dual connectivity for the UE.

In an example dual-connectivity setup process, the MN could first identify a second-RAT access node to serve as an SN for the UE and could determine a second-RAT carrier on which to establish for the UE a second-RAT connection between the UE and that SN. And the MN could then engage in signaling with the core-network controller, with the SN, and with the UE, to establish for the UE the second-RAT connection on that second-RAT carrier.

Further, the MN could coordinate bearer connectivity for the UE via the SN, to enable a portion of the UE's packet-data flow to be served by the MN concurrently with another portion of the UE's packet-data flow being served by the SN. For instance, the MN could engage in signaling to transfer the UE's access bearer from being between the MN and the gateway to instead being between the SN and the gateway, and a leg of the bearer could extend between the MN and the SN. That way, when the core network has data destined to the UE, that data would flow to the SN, (i) the SN could transmit a portion of the data over the UE's second-RAT connection to the UE, and (ii) the SN could send another portion of the data to the MN, which the MN could transmit over the UE's first-RAT connection to the UE. And when the UE has data to transmit, (i) the UE could transmit a portion of the data over the UE's second-RAT connection to the SN, which the SN could forward into the core network, and (ii) the UE could transmit another portion of the data over the UE's first-RAT connection to the MN, which the MN could send to the SN and the SN could forward into the core network. Other bearer arrangements are possible as well.

With these first-RAT and second-RAT connections and bearer connectivity established for the UE, the MN and SN could then serve the UE with packet-data communications on their respective connections with the UE, each in the manner discussed above, for instance with a portion of data flowing over the UE's first-RAT connection between the UE and the MN concurrently with another portion of the data flowing over the UE's second-RAT connection between the UE and the SN. In a representative system, the access nodes that could cooperatively function as MN and SN for dual-connectivity service of one or more such UEs could regularly engage in inter-access-node data communications with each other. For instance, the access nodes could regularly engage in user-plane communications, such as transfer of UE data as discussed above, and control-plane communications such as interface-management signaling, mobility-management signaling, load reporting, and secondary-connection usage reporting, among others.

These communications could occur on one or more pre-configured inter-access-node interfaces, such as industry standard X2 and/or Xn interfaces or other virtual packet tunnels, through physical communication paths between the access nodes. For instance, if the access nodes are collocated with each other at a common cell site, they could communicate with each other on a preconfigured X2 interface and/or Xn interface through a local cell site router or other local connection mechanism. Or if the access nodes are separately located, they could communicate with each other on a preconfigured X2 interface and/or Xn interface through respective local routers and perhaps one or more intervening networks or other connections.

Unfortunately, however, these access nodes, interfaces, and/or physical communication paths may support up to only a limited quantity of inter-access-node communication per unit time—possibly due to maximum bit rates of network ports and physical connection media, processing restrictions, configuration settings, and/or other factors. As a result, at times of heavy load, the access nodes may experience delays in communicating with each other. And particularly with respect to transfer of UE data, but also for other communications, such delay could be problematic, possibly giving rise to user-experience issues.

The present disclosure provides a mechanism that may help to address this.

In accordance with the disclosure, a computing system will monitor an extent of user-plane data flow between a pair of access nodes, and the computing system will use that monitored extent of user-plane data flow as a basis to control new establishment of dual-connectivity service to be provided cooperatively by the pair of access nodes. Namely, when the total volume of user-plane data flow between the access nodes is relatively high (e.g., at or above a predefined threshold), the computing system could block the new establishment of dual-connectivity service to be provided cooperatively by the pair of access nodes. This regulated establishment of dual-connectivity service may help to avoid or reduce the likelihood of, or otherwise address, an overload situation that could give rise to the delay issue noted above.

In a representative system, the pair of access nodes may cooperatively provide dual-connectivity service to UEs, and of the data that flows between the pair of access nodes, perhaps over one or more inter-access-node interfaces, a proper subset (i.e., less than all) may be user-plane data of the dual-connectivity service. The computing system's analysis of the extent of user-plane data that flows between the pair of access nodes could be focused on this proper subset of data as the basis to control whether to allow new establishment of dual-connectivity service that would be provided cooperatively by the pair of access nodes.

Further, this blocking could be temporary. For instance, after a predetermined time period following the start of the blocking, and/or after determining that the extent of user-plane data flowing between the access nodes is relatively low (e.g., at or below the predefined threshold), the computing system could revert to allowing new establishment of dual-connectivity service to be provided cooperatively by the pair of access nodes.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB and setup of bearer connectivity for the UE. And the 4G eNB and 5G gNB could then concurrently serve the UE over their respective 4G and 5G connections with the UE. It should be understood, however, that the principles disclosed herein could extend to apply with respect to other scenarios as well, such as with respect to other RATs and other dual connectivity configurations, including possibly a single-RAT dual connectivity arrangement. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
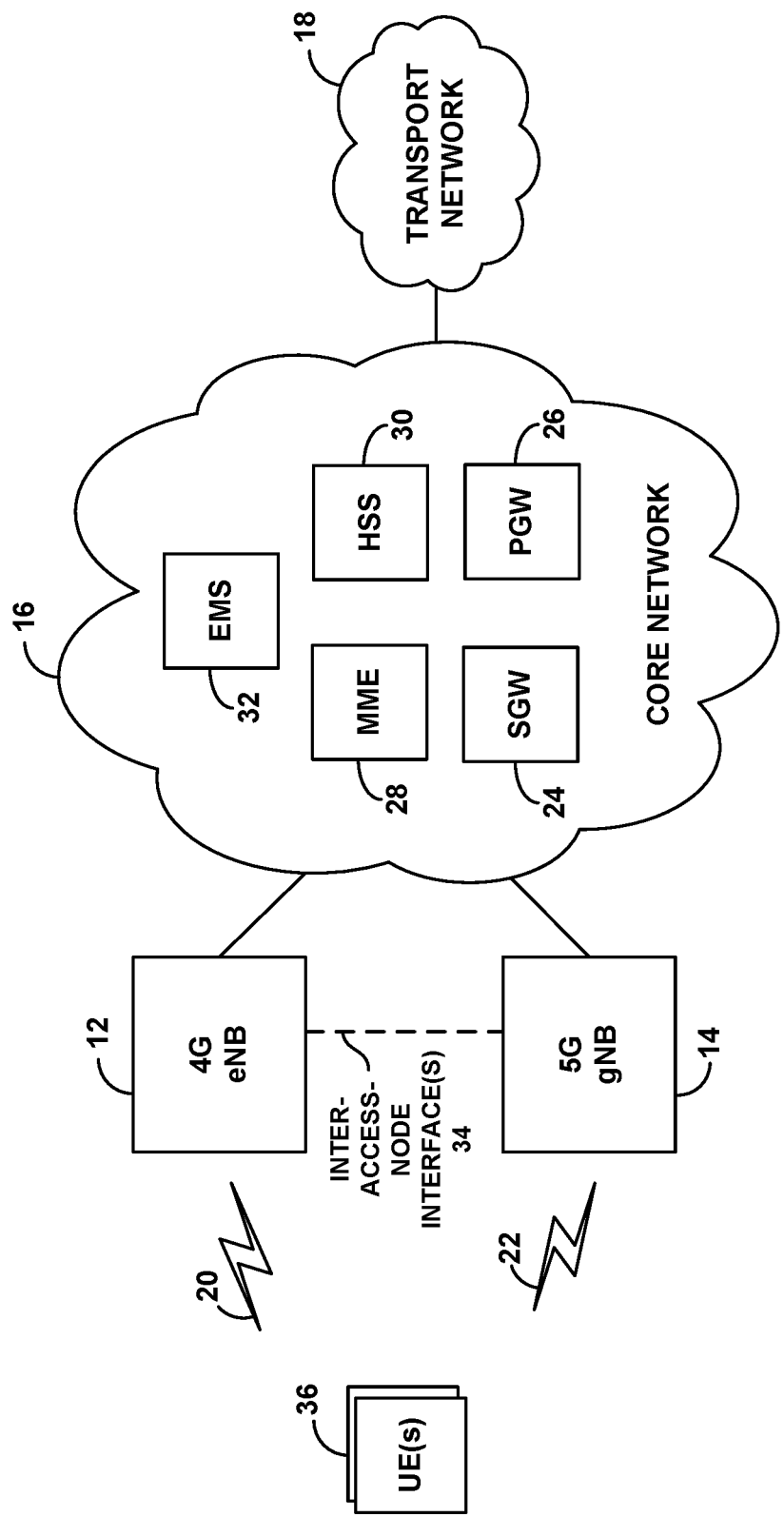
FIG. 1 is a simplified block diagram of an example network arrangement in which features of the present disclosure can be implemented.

Referring to the drawings, FIG. 1 is a simplified block diagram of an example network arrangement having a 4G eNB 12 and a 5G gNB 14 each coupled with a representative core network 16 that provides connectivity with a transport network 18 such as the Internet.

The 4G eNB 12 and 5G gNB 14 could be macro access nodes of the type configured to provide a wide range of coverage or could take other forms, such as small cell access nodes, relays, femtocell access nodes, or the like, possibly configured to provide a smaller range of coverage. Further, the access nodes could be collocated with each other, e.g., at a common cell site, or could be separately located. Either way, the access nodes could be optimally configured to provide overlapping coverage in order to support EN-DC service.

In the example illustrated, the 4G eNB 12 is configured to provide 4G coverage and service on at least one 4G carrier 20, and the 5G gNB 14 is configured to provide 5G coverage and service on at least one 5G carrier 22. As discussed above, each of these carriers could have a duplex mode (i.e., TDD or FDD) and could be defined at a specific frequency position in a respective band and have a respective frequency bandwidth (e.g., as its overall bandwidth if TDD or as the bandwidth of its downlink channel or uplink channel (perhaps the same as each other) if FDD).

To facilitate providing service and coverage on the illustrated carriers, the access nodes could have a respective antenna structures, such as an antenna array, that is configured to transmit and receive electromagnetic signals in a region defined by an antenna pattern or radiation pattern, or the access nodes could share portions of a common antenna array for this purpose. And the access nodes could include other communication equipment, such as baseband units, radio heads, power amplifiers, and the like.

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In a representative arrangement, the core network 16 could be a packet-switched network such as an industry standard Evolved Packet Core (EPC) network or Next Generation Core (NGC) network. In the example shown, for instance, the core network 16 could be an EPC network including a serving gateway (SGW) 24, a packet data network gateway (PGW) 26, a mobility management entity (MME) 28, a home subscriber server (HSS) 30, and an element management system (EMS) 32, although other arrangements are possible as well. In an example implementation, without limitation, each access node could have an interface with the SGW 24, the SGW 24 could have an interface with the PGW 26, and the PGW 26 could provide connectivity with the transport network 18. Further, each access node could have an interface with the MME 28, and the MME 28 could have an interface with the SGW 24, so that the MME 28 could coordinate setup of bearers for UEs to enable the UEs to engage in packet-data communication via 4G and 5G. Alternatively, just the 4G eNB 12 might have an interface with the MME 28 and may function as an anchor for control signaling with the MME 30 both for 4G service and for EN-DC service.

Still further, the HSS 30 could store or have access to UE profile records, which could specify service-subscription plans, UE configurations, and/or other such UE capability information, such as whether a UE is EN-DC capable for instance. And the EMS 32 could operate as a central repository of operational data for the wireless communication network and to control and manage operation of various network elements such as the access nodes.

FIG. 1 also illustrates one or more inter-access-node interfaces 34 extending between the 4G eNB 12 and the 5G gNB 14. As noted above, the one or more inter-access node interfaces 34 could include one or more virtual packet tunnels, such as an X2 interface and/or an Xn interface, and could be defined on physical communication media such as one or more networks or other connections between the access nodes. While the figure depicts the one or more interfaces as a direct communication path between the access nodes outside of the core network 16, the access nodes could alternatively or additionally communicate with each other through another (e.g., more complex) communication path and possibly through the core network 16.

In addition, FIG. 1 illustrates multiple example UEs 36 that may from time to time be within coverage of the 4G eNB 12 and/or the 5G gNB 14. These UEs could take any of the forms noted above among other possibilities. And each UE may be equipped with a 4G LTE radio and a 5G NR radio and may include associated circuitry and logic that enables the UE to engage in 4G LTE service and 5G NR service, and perhaps also EN-DC service. Further, the 4G eNB 12 and 5G gNB 14 could be configured to serve multiple such UEs at once and, as noted above, to support providing EN-DC service.

In an example implementation, upon entering into coverage of cell site 12, each such UE could initially scan for 4G coverage and could discover threshold strong coverage of the 4G eNB 12 on a 4G carrier 20, and the UE could then responsively engage in random access and RRC signaling with the 4G eNB 12 to establish a 4G connection between the UE and the 4G eNB 12 on that 4G carrier 20. Further, the 4G eNB 12 could establish in data storage a context record for the UE indicating the UE's connection state, including for instance an indication of the 4G carrier 20 on which the UE is connected with the 4G eNB 12. And the 4G eNB 12 could report this status to the EMS 32.

Once the UE is connected with the 4G eNB 12, if the UE is not already registered with the core network 16, the UE could then also transmit to the 4G eNB 12 an attach request message, which the 4G eNB 12 could forward to the MME 28 for processing. And upon authenticating and authorizing the UE for service, the MME 28 and 4G eNB 12 could coordinate setup for the UE of at least one user-plane bearer. For instance, the MME 28 could engage in signaling with the 4G eNB 12 and the SGW 24 to coordinate setup for the UE of an S1-U packet tunnel between the 4G eNB 12 and the SGW 24, and the SGW 24 could responsively engage in signaling with the PGW 26 to coordinate setup for the UE of an associated S5 packet tunnel between the SGW 24 and the PGW 26. Further, the 4G eNB 12 could engage in signaling with the UE to establish for the UE an associated data radio bearer (DRB).

Once the UE is connected with the 4G eNB 12 and registered with core network 16, the 4G eNB 12 could then serve the UE with wireless packet-data communications as noted above. For instance, when the PGW 26 receives data on the transport network 18 for transmission to the UE, that data could flow via the UE's access bearer to the 4G eNB 12, and the 4G eNB 12 could coordinate transmission of that data from the 4G eNB 12 to the UE on downlink PRBs of the 4G carrier 20. And when the UE has data for transmission on the transport network 18, the UE could transmit a scheduling request to the 4G eNB 12, the 4G eNB 12 could coordinate transmission of that data from the UE to the 4G eNB 12 on uplink PRBs of the 4G carrier 18, and the data could then flow via the UE's access bearer to the PGW 26, for output on the transport network 18.

In addition, in relation to the UE's connection and/or attachment process or at another time, the 4G eNB 12 could also obtain capabilities data regarding the UE and could store the capabilities data in the UE context record for reference while serving the UE. For instance, during the attachment process, the MME 28 could obtain this data from the HSS 30 and could convey the data to the 4G eNB 12 for storage. Alternatively or additionally, the 4G eNB 12 could transmit to the UE an RRC message carrying a UE-capability enquiry, and the UE could respond to the 4G eNB 12 with a "UE capability information" information element (IE) specifying UE capabilities data. And this capabilities data could indicate whether the UE supports EN-DC.

For each such connected UE, if the UE's capabilities data indicates that the UE is EN-DC capable, and/or if one or more other factors justify or trigger it, the 4G eNB 12 could then work to establish EN-DC service for the UE.

In line with the discussion above, for instance, the 4G eNB 12 could first identify the 5G gNB 14 and a 5G carrier 22 to be used for a secondary 5G connection for the UE. And the 4G eNB 12 could then engage in signaling to set up EN-DC service for the UE so that the UE can be served concurrently by the 4G eNB 12 and the 5G gNB 14.

For instance, the 4G eNB 12, operating as MN, could first engage in process to add for the UE a 5G connection with the 5G gNB 14, such as by transmitting to the 5G gNB 14 an SN-Addition request to cause the 5G gNB to allocate resources for that 5G connection, receiving an SN-Addition-Request acknowledge message from the 5G gNB 14, and engaging in associated RRC signaling with the UE, in response to which the UE could then access and complete establishment of the 5G connection with the 5G gNB 14. Further, the 4G eNB 12 could engage in signaling to establish bearer connectivity for the UE via the 5G gNB 14. For instance, the 4G eNB 12 could engage in signaling with the MME 28 and the 5G gNB 14 to arrange for transfer of the UE's S1-U tunnel from being between the SGW 24 and the 4G eNB 12 to instead being between the SGW 24 and the 5G gNB 14.

Still further, the 4G eNB 12 could update the UE's context record to indicate that the UE is now EN-DC-connected, having the 4G connection with the 4G eNB 12 on 4G carrier 20 and having the 5G connection with the 5G gNB on the determined carrier 22, among possibly other information. And the 4G eNB 12 could report this connection status to the EMS 34 as well.

With EN-DC service so set up, the 4G eNB 12 and 5G gNB 14 could then concurrently serve the UE over their respective connections with the UE, with the UE's data flow being split between the UE's 4G and 5G connections.

For instance, when the PGW 26 receives data on the transport network 18 for transmission to the UE, that data could flow via the UE's access bearer to the 5G gNB 14, the 5G gNB 14 could split that data into first and second portions and (i) could send the first portion over an inter-access-node interface 34 to the 4G eNB 12 for transmission by the 4G eNB 12 over the UE's 4G connection to the UE and (ii) could itself transmit the second portion over the UE's 5G connection to the UE.

And when the UE has data for transmission on the transport network, the UE could split that data into first and second portions and (i) could send the first portion over the UE's 4G connection to the 4G eNB 12, which the 4G eNB 12 could then pass over an inter-access-node interface 34 to the 5G gNB 14, from where the data could flow over the UE's access bearer for ultimate output on the transport network 18 and (ii) could send the second portion over the UE's 5G connection to the 5G gNB 14, from where that data as well could flow over the UE's access bearer for ultimate output on the transport network 18.

In line with the discussion above, the present disclosure provides a method for a computing system to control new establishment of EN-DC service to be provided cooperatively by the 4G eNB 12 and the 5G gNB 14, where the controlling new establishment of this EN-DC service is based on at least an evaluation of the volume of user-plane data flowing between the 4G eNB 12 and the 5G gNB 14. The computing system that carries this out could be provided by various network entities, examples being the 4G eNB 12, the 5G gNB 14, or the EMS 32. For instance, a host processor or other processing unit at such an entity could carry out the process by executing stored program instructions.

For example, if one of the access nodes does this, the access node could monitor the data that is flowing between the 4G eNB 12 and the 5G gNB 14 and determine how much of this data corresponds to user-plane data. The data that is flowing between the 4G eNB 12 and the 5G gNB 14 could be over one or more inter-access node interfaces 34, e.g., an X2 and/or an Xn interface, which may extend between 4G eNB 12 and the 5G gNB 14.

To monitor the data that is flowing between the 4G eNB 12 and the 5G gNB 14, the access node could identify the user-plane data based on one or more communication protocol headers of the data that is flowing across the 4G eNB 12 and the 5G gNB 14. In some examples, the 4G eNB 12 or the 5G gNB 14 could send control-plane data using stream control transmission protocol (SCTP) and could send user-plane data using user datagram protocol (UDP). These different protocols may use different communication protocol headers, and the access node could differentiate the user-plane data from other types of data, e.g., control-plane data, based on these headers. Other methods of identifying and monitoring the volume of user-plane data that flows across the 4G eNB 12 and the 5G gNB 14 are also possible.

In an example implementation, the access node could track a sum of two quantities: (1) the total quantity of the user-plane data per second that the access node transmits to the other access node and (2) the total quantity of user-plane data per second that the access node receives from the other access node. And the access node could maintain a running average of that sum for the past minute or over another sliding window of time. That way, at any given time, the access node could have a most recent measure of total volume of user-plane data that flows between it and the other access node. Further, the access node could roll up a statistical average or other measure of this total-data-volume per time of day or otherwise on a clock or calendar basis, to facilitate predicting based on historical information what the total volume of user-plane data is likely to be at a current or upcoming time of day or the like.

Alternatively, if the EMS 32 does this, the EMS 32 could receive from the 4G eNB 12 and/or the 5G eNB 14, regular reports of the total volume of user-plane data that flows between the 4G eNB 12 and the 5G gNB 14 and/or regular statistical representations of that information, among other possibilities, also possibly on a clock or calendar basis.

Further, the total volume of user-plane data that flows between the 4G eNB 12 and the 5G gNB 14 could be represented in various forms. For example, the total volume of user-plane data could be represented as data rate (e.g., number of bits per unit time) and/or as a percentage of an expected or known maximum data rate or other level, among other possibilities.

Based on at least this total monitored total volume of user-plane data that flows between the 4G eNB 12 and the 5G gNB 14, the computing system could then control new establishment of EN-DC service to be provided cooperatively by the 4G eNB 12 and the 5G gNB 14 in the wireless communication system. In line with the discussion above, for instance, at times when the total volume of user-plane data that flows across the 4G eNB 12 and the 5G gNB 14 is relatively high (e.g., above a predefined threshold), the computing system could block new establishment of the EN-DC service to be provided cooperatively by the 4G eNB 12 and the 5G gNB 14.

The act of blocking new establishment of EN-DC service to be provided cooperatively by the 4G eNB 12 and the 5G gNB 14 could also take various forms.

Without limitation, for instance, the 4G eNB 12 could configure itself to not establish EN-DC for UEs or to avoid establishing EN-DC for UEs with the 5G gNB 14 serving as SN. With this configuration, if and when the 4G eNB 12 would otherwise establish EN-DC for a UE where the 5G gNB 14 would be the UE's SN, the 4G eNB 12 could instead forgo establishment of that EN-DC service and instead continue to serve the UE with standalone 4G service, or the 4G eNB 12 could instead establish EN-DC service for the UE using a different 5G gNB as the UE's SN.

Alternatively, if the 5G gNB 14 carries out this process, the 5G gNB 14 could configure itself to not accept establishment of EN-DC for UEs where the 4G eNB 12 serves as MN. With this configuration, if and when the 5G gNB 14 would receive an SN-Addition request from the 4G eNB 12, the 5G gNB 14 could refuse the request, which could lead the 4G eNB 12 to abandon the EN-DC-setup process for the UE or to set up EN-DC for the UE using a different 5G gNB as SN.

And still alternatively, if the EMS 32 carries out this process, the EMS 32 could direct and thus cause the 4G eNB 12 or 5G gNB 14 to carry out such blocking. For instance, the EMS 32 could transmit to the 4G eNB 12 or 5G gNB 14 a control signal to which the recipient access node is configured to respond by blocking new establishment of EN-DC service to be provided cooperatively by the 4G eNB 12 and the 5G gNB. Other examples could be possible as well.

Further, this blocking could be temporary, possibly being maintained until the user-plane data flow between the 4G eNB 12 and 5G gNB 14 is no longer threshold high and/or until a predefined time period passes For example, after blocking new establishment of this dual-connectivity service, the computing system could continue to monitor the total volume of user-plane data that flows between the 4G eNB 12 and the 5G gNB 14 and compare that total volume to a predefined threshold. And upon determining that the total volume of user-plane data no longer exceeds that threshold, the computing system could then revert to allow new establishment of EN-DC service to be provided cooperatively by the 4G eNB 12 and the 5G gNB 14, reversing the blocking discussed above.

Alternatively, after blocking new establishment of the EN-DC service, the computing system could apply a timer for the predetermined time period. And upon expiration of the timer, the computing system could then revert to allowing new establishment of the EN-DC service. Or upon expiration of the timer, the computing system could then newly evaluate the total volume of user-plane data being communicated between the 4G eNB 12 and the 5G gNB 14 during a recent time period, to determine whether or not to continue blocking new establishment of the EN-DC service.

Figure 2:
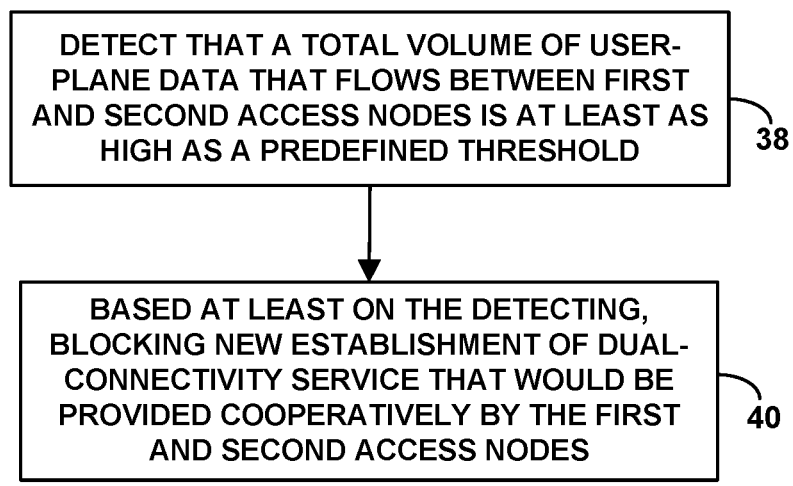
FIG. 2 is a flow chart depicting a method that could be carried out in accordance with the disclosure.

FIG. 2 is a flow chart depicting a method that could be carried out in accordance with the present disclosure to control signaling between a first access node and a second access node in a system where the first access node and second access node are each configured to provide respective wireless coverage and service, where the first and second access nodes cooperatively support providing UEs with dual connectivity service, and where data flows between the first and second access nodes, and where a proper subset of this data is user-plane data. As noted above, the first and second access nodes in this method could operate according to different RATs than each other. For instance, the first access node could operate according to 4G LTE, and the second access node could operate according to 5G NR.

As shown in FIG. 2, at block 38, the method includes detecting that a total volume of user-plane data that flows between the first and second access nodes is at least as high as a predefined threshold. And at block 40, the method includes, based at least on the detecting, blocking new establishment of dual-connectivity service that would be provided cooperatively by the first and second access nodes. Note that, while the figure shows these operations occurring sequentially, they could also be carried out as parallel threads, by regularly engaging in the detecting and blocking new establishment of the dual-connectivity service based on the detecting.

In line with the discussion above, the user-plane data that flows between the first and second access nodes in this method could include data communicated between the first and second access nodes due to bearer splitting of the dual-connectivity service at an access node, e.g., the second access node. And this user-plane data could flow over an inter-access-node interface, such as an X2 or an Xn interface, which could extend between the first and second access nodes.

In addition, as discussed above, the act of detecting that a total volume of user-plane data that flows between the first and second access nodes is at least as high as a predefined threshold could involve (i) identifying the user-plane data as the proper subset of the data that flows on the inter-access-node interface, and (ii) determining the total volume of the identified user-plane data. And as noted above, the act of identifying that the user-plane data as the proper subset of the data that flows between the first and second access nodes could be based on one or more communication protocol headers of the data that flows across the first and second access nodes.

Further, as noted above, the act of detecting that a total volume of the user-plane data that flows between the first and second access nodes is at least as high as a predefined threshold could include monitoring the total volume of the user-plane data that flows between the first and second access nodes on average over a sliding window frame of time. And the act of detecting that a total volume of the user-plane data that flows between the first and second access nodes is at least as high as a predefined threshold could be predictive based on historical data-volume information.

In addition, as noted above, the first access node in this method could be a master access node (e.g., MN), and the second access node could be a secondary access node (e.g., SN). And in that case, the first access node and/or second access node could carry out the detecting that a total volume of the user-plane data that flows between the first and second access nodes is at least as high as a predefined threshold and the blocking new establishment of the dual-connectivity service.

Still further, as discussed above, the act of blocking new establishment of the dual-connectivity service could be temporary. For instance, the blocking could be maintained for a predetermined time period and/or until determining that the total volume of the user-plane data flow between the first and second access nodes is no longer threshold high, at which point the method could include reverting to allow new establishment of the dual-connectivity service to be provided cooperatively by the first and second access nodes.

Figure 3:
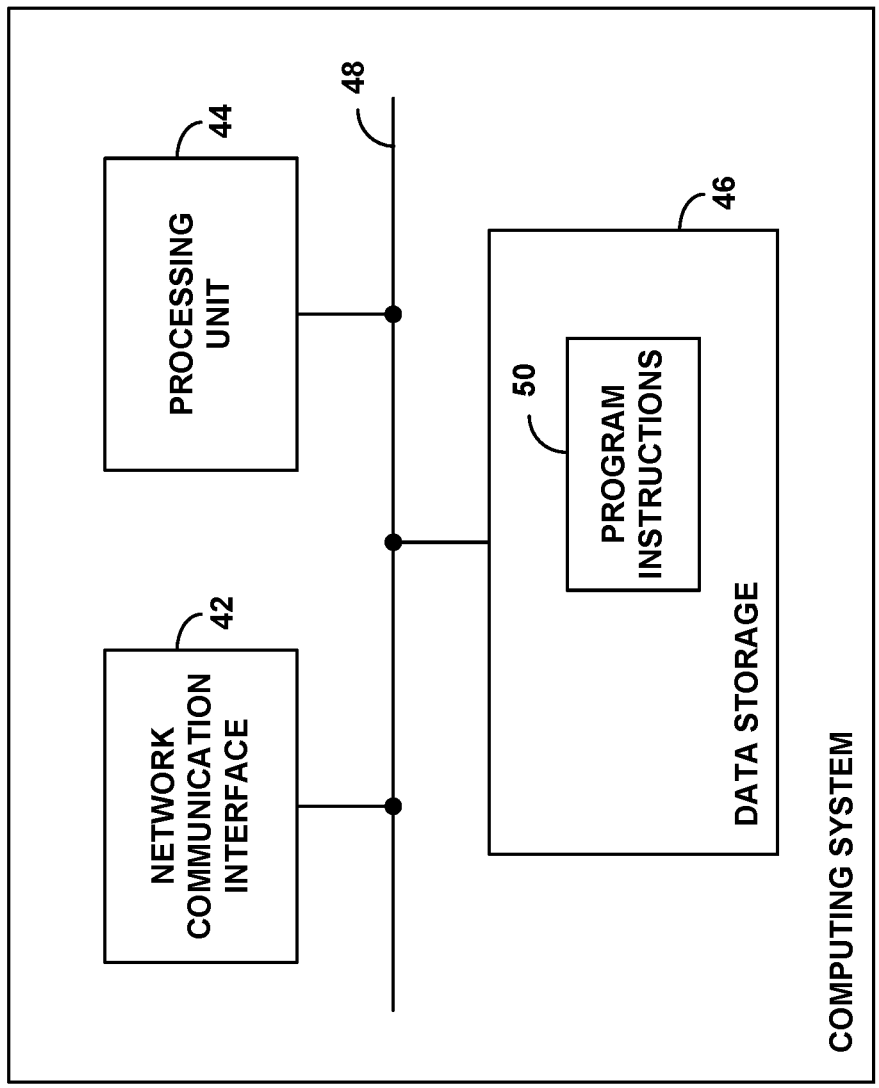
FIG. 3 is a simplified block diagram of an example computing system operable in accordance with the disclosure.

FIG. 3 is next a simplified block diagram of an example computing system that could be operable to control transmission of signaling between a first access node and a second access node in an arrangement where the first access node and second access node are each configured to provide respective wireless coverage and service. As noted above, this computing system could be provided at the first access node, at the second access node, or at an EMS, among other possibilities.

As shown in FIG. 3, the example computing system includes a network communication interface 42, a processing unit 44, and non-transitory data storage 46, all of which could be integrated together and/or interconnected by a system bus, network, or other connection mechanism 48.

The network communication interface 42 could comprise a physical network connector and associated communication logic (e.g., protocol stacks) to facilitate network communication with various other entities. The processing unit 44 could comprise one or more general purpose processors (e.g., microprocessors) and/or one or more special-purpose processors (e.g., application specific integrated circuits). And the non-transitory data storage 46 could comprise one or more volatile and/or non-volatile storage components (e.g., magnetic, optical, or flash storage).

As shown, the data storage 46 could then store program instructions 50, which could be executable by the processing unit 44 to cause the computing system to carry out various operations described herein, such as the operations depicted and described with respect to FIG. 2 for instance.

Various other features described above can be implemented in this context as well, and vice versa.

Figure 4:
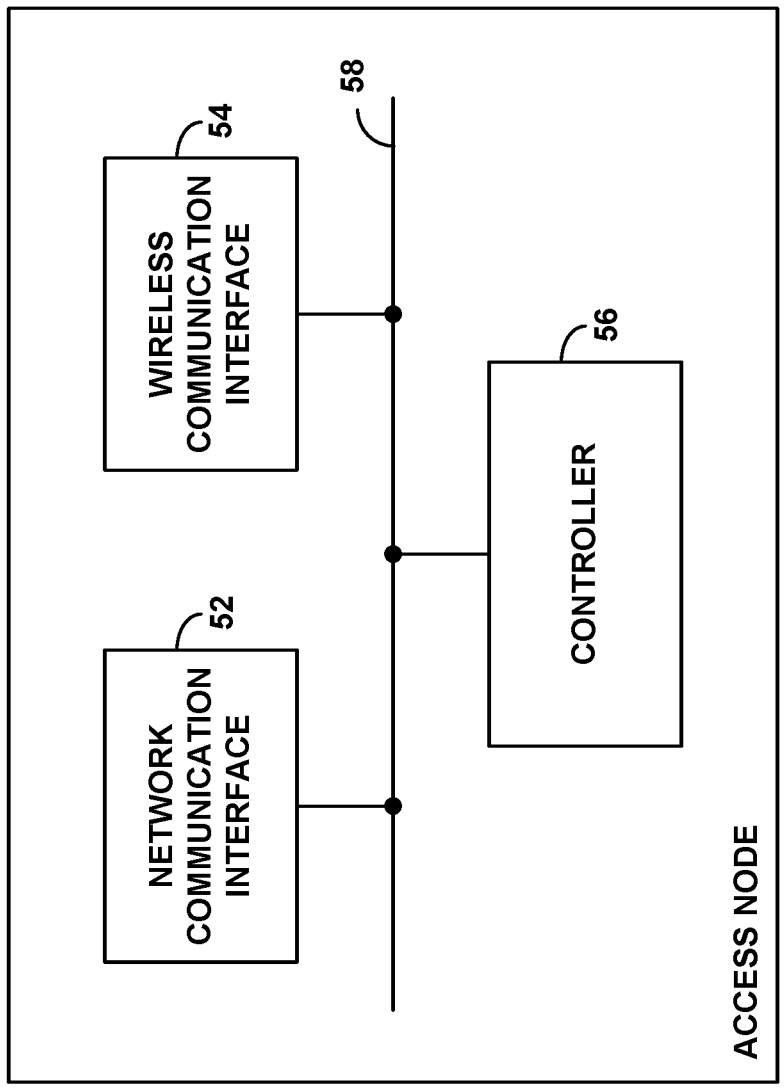
FIG. 4 is a simplified block diagram of an example access node operable in accordance with the disclosure.

FIG. 4 is next a simplified block diagram of an example first access node that could operate in a wireless communication system such as that noted above for example, to carry out various features described herein. As shown, the example first access node includes a network communication interface 52, a wireless communication interface 54, and a controller 56, all of which could be integrated together and/or communicatively linked together by a system bus, network, or other connection mechanism 58.

In an example implementation, the network communication interface 52 could comprise a wired or wireless interface, such as an Ethernet network communication interface, configured to support backhaul communication on a core network and with one or more other access nodes such as inter-access-node communication with the second access node. And the wireless communication interface 54 could comprise an antenna structure, which could be tower mounted or could take other forms, and associated components such as a power amplifier and a wireless transceiver, so as to facilitate providing a coverage area defining an air interface and engaging air- interface communication on the air interface.

Further, the controller 56 (which might be provided by a baseband unit of the access node, for instance) could comprise one or more processing units (e.g., one or more general purpose processors and/or specialized processors) programmed to cause the access node to carry out various operations such as those discussed herein, including for example the operations of FIG. 2.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling dual connectivity establishment in a wireless communication system including a first access node and a second access node, wherein the first and second access nodes cooperatively support providing user equipment devices (UEs) with dual connectivity service, wherein data flows between the first and second access nodes, and wherein a proper subset of the data that flows between the first and second access nodes is user-plane data of the dual connectivity service, the method comprising:
   detecting that a total volume of the user-plane data that flows between the first and second access nodes is at least as high as a predefined threshold; and
   based at least on the detecting, blocking new establishment of the dual connectivity service, wherein blocking new establishment of the dual connectivity service comprises blocking at least one UE from becoming concurrently connected with both the first access node and the second access node.

2. The method of claim 1, wherein detecting that a total volume of the user-plane data that flows between the first and second access nodes is at least as high as a predefined threshold comprises:
   identifying the user-plane data as the proper subset of the data that flows between the first and second access nodes; and
   determining the total volume of the identified user-plane data.

3. The method of claim 2, wherein identifying that the user-plane data as the proper subset of the data that flows between the first and second access nodes is based on one or more communication protocol headers of the data that flows between the first and second access nodes.

4. The method of claim 1, wherein detecting that a total volume of the user-plane data that flows between the first and second access nodes is at least as high as a predefined threshold comprises monitoring the total volume of the user-plane data on average over a sliding window frame of time.

5. The method of claim 1, wherein detecting that a total volume of the user-plane data that flows between the first and second access nodes is at least as high as a predefined threshold is predictive based on historical data-volume information.

6. The method of claim 1, wherein, in the dual connectivity service, the first access node is a master access node and the second access node is a secondary access node.

7. The method of claim 6, wherein detecting that a total volume of the user-plane data that flows between the first and second access nodes is at least as high as a predefined threshold is carried out at least in part by the first access node.

8. The method of claim 6, wherein blocking new establishment of the dual connectivity service is carried out at least in part by the first access node.

9. The method of claim 6, wherein the method is carried out at least in part by the second access node.

10. The method of claim 1, wherein the user-plane data flowing between the first and second access nodes comprises data communicated between the first and second access nodes due to bearer splitting of the dual connectivity service at the second access node.

11. The method of claim 1, wherein the proper subset of data flows between the first and second access nodes is flowing across one or more inter-access-node interfaces, and wherein each inter-access-node interface is selected from the group consisting of an X2 interface and an Xn interface.

12. The method of claim 1, wherein the first access node operates according to a first radio access technology (RAT) and the second access node operates according to a second RAT different from the first RAT.

13. The method of claim 1, wherein blocking new establishment of the dual connectivity service is for a predetermined time period, wherein the method further comprises reverting to allow new establishment of the dual connectivity service after blocking new establishment of the dual connectivity service for the predetermined time period.

14. The method of claim 1, further comprising, after blocking new establishment of the dual connectivity service:
   detecting that the total volume of the user-plane data that flows between the first and second access nodes is no longer at least as high as the predefined threshold; and
   based at least on the detecting that the total volume of the user-plane data that flows between the first and second access nodes is no longer at least as high as the predefined threshold, reverting to allow new establishment of the dual connectivity service.

15. A computing system operable in a wireless communication system including a first access node and a second access node, wherein the first and second access nodes cooperatively support providing user equipment devices (UEs) with dual connectivity service, wherein data flows between the first and second access nodes, and wherein a proper subset of data that flows between the first and second access nodes is user-plane data of the dual connectivity service, the computing system comprising:
- a processing unit;
- non-transitory data storage; and
- program instructions stored in the non-transitory data storage and executable by the processing unit to carry out operations including:
  - detecting that a total volume of the user-plane data that flows between the first and second access nodes is at least as high as a predefined threshold, and
  - based at least on the detecting, blocking new establishment of the dual connectivity service, wherein blocking new establishment of the dual connectivity service comprises blocking at least one UE from becoming concurrently connected with both the first access node and the second access node.

16. The computing system of claim 15, wherein detecting that a total volume of the user-plane data that flows between the first and second access nodes is at least as high as a predefined threshold comprises monitoring the total volume of the user-plane data on average over a sliding window frame of time.

17. The computing system of claim 15, wherein blocking new establishment of the dual connectivity service is for a predetermined time period, wherein the operations further include reverting to allow new establishment of the dual connectivity service after blocking new establishment of the dual connectivity service for the predetermined time period.

18. The computing system of claim 15, the operations further comprising, after blocking new establishment of the dual connectivity service:
- detecting that the total volume of the user-plane data that flows between the first and second access nodes is no longer at least as high as the predefined threshold; and
- based at least on the detecting that the total volume of the user-plane data that flows between the first and second access nodes is no longer at least as high as the predefined threshold, reverting to allow new establishment of the dual connectivity service.

19. In a wireless communication system comprising a first access node configured to provide service according to a first radio access technology (RAT) and a second access node configured to provide service according to a second RAT, wherein the first access node and second access node cooperatively support providing user equipment devices (UEs) with dual-connectivity service, wherein an inter-access-node interface extends between the first and second access nodes, and wherein a proper subset of data that flows between the first and second access nodes on the inter-access-node interface is user-plane data of the dual-connectivity service, the first access node comprising:
- a wireless communication interface through which to engage in air-interface communication and provide the service according to the second RAT; and
- a controller, wherein the controller is configured to cause the first access node to carry out operations including:
  - detecting that a total volume of the user-plane data that flows between the first and second access nodes on the inter-access-node interface is at least as high as a predefined threshold, and
  - based at least on the detecting, blocking new establishment of the dual- connectivity service, wherein blocking new establishment of the dual connectivity service comprises blocking at least one UE from becoming concurrently connected with both the first access node and the second access node.

20. The wireless communication system of claim 19, wherein the controller comprises a processing unit, non-transitory data storage, and program instructions stored in the non-transitory data storage and executable by the processing unit to cause the first access node to carry out the operations.

* * * * *